United States Patent
Mahgerefteh et al.

(10) Patent No.: US 7,742,542 B2
(45) Date of Patent: Jun. 22, 2010

(54) PHASE CORRELATED QUADRATURE AMPLITUDE MODULATION

(75) Inventors: Daniel Mahgerefteh, Los Angeles, CA (US); Xueyan Zhang, Culver City, CA (US); Parviz Tayebati, Weston, MA (US)

(73) Assignee: Finisar Corporation, Sunnyvale, CA (US)

( * ) Notice: Subject to any disclaimer, the term of this patent is extended or adjusted under 35 U.S.C. 154(b) by 819 days.

(21) Appl. No.: 11/157,055

(22) Filed: Jun. 20, 2005

(65) Prior Publication Data

US 2006/0039502 A1    Feb. 23, 2006

Related U.S. Application Data

(63) Continuation-in-part of application No. 10/289,944, filed on Nov. 6, 2002, now Pat. No. 6,963,685, and a continuation-in-part of application No. 10/308,522, filed on Dec. 3, 2002, and a continuation-in-part of application No. 10/680,607, filed on Oct. 6, 2003, now Pat. No. 7,054,538.

(60) Provisional application No. 60/581,076, filed on Jun. 18, 2004, provisional application No. 60/615,834, filed on Oct. 4, 2004.

(51) Int. Cl.
*H04L 27/36* (2006.01)

(52) U.S. Cl. .................. 375/298; 375/300; 375/303; 375/308; 375/230; 375/329; 375/334

(58) Field of Classification Search ................ 375/298, 375/300, 303, 308, 320, 329, 334
See application file for complete search history.

(56) References Cited

U.S. PATENT DOCUMENTS

| 3,324,295 A | 6/1967 | Harris |
| 3,999,105 A | 12/1976 | Archey et al. |
| 4,038,600 A | 7/1977 | Thomas et al. |
| 4,561,119 A | 12/1985 | Epworth |
| 4,805,235 A | 2/1989 | Henmi |

(Continued)

FOREIGN PATENT DOCUMENTS

| GB | 2107147 | 4/1983 |
| WO | 9905804 | 2/1999 |
| WO | 0104999 | 1/2001 |
| WO | 03005512 | 1/2003 |

OTHER PUBLICATIONS

Chang-Hang Lee et al., Transmission of Directly Modulated 2.5-Gb/s Signals Over 250-km of Nondispersion-Shifted Fiber by Using a Spectral Filtering Method, IEEE Photonics Technology Letters, Dec. 1996, pp. 1725-1727, vol. 8, No. 12.

Corvini et al., Computer Simulation of High-Bit-Rate Optical Fiber Transmission Using Single-Frequency Lasers, Journal of Lightwave Technology, Nov. 1987, 1591-1595, vol. LT-5, No. 11.

(Continued)

*Primary Examiner*—Shuwang Liu
*Assistant Examiner*—Kabir A Timory
(74) *Attorney, Agent, or Firm*—Workman Nydegger

(57) ABSTRACT

A method for transmitting a base band digital data signal having a bit period and a first bandwidth, comprising providing a carrier wave having a carrier amplitude and a carrier frequency, and synchronously modulating both the carrier amplitude and carrier frequency with the base band digital signal, so as to reduce the bandwidth of the modulated carrier wave below the bandwidth of the base band signal. A method for transmitting a base band digital data signal having a bit period and a first bandwidth, comprising providing a carrier wave having a carrier phase and a carrier frequency, and synchronously modulating both the carrier phase and carrier frequency with the base band digital signal, so as to reduce the bandwidth of the modulated carrier wave below the bandwidth of the base band signal.

4 Claims, 3 Drawing Sheets

U.S. PATENT DOCUMENTS

| | | | |
|---|---|---|---|
| 4,841,519 A | 6/1989 | Nishio | |
| 5,293,545 A | 3/1994 | Huber | |
| 5,325,378 A | 6/1994 | Zorabedian | |
| 5,371,625 A | 12/1994 | Wedding et al. | |
| 5,412,474 A | 5/1995 | Reasenberg et al. | |
| 5,416,629 A | 5/1995 | Huber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,592,327 A | 1/1997 | Gabl et al. | |
| 5,737,104 A | 4/1998 | Lee et al. | |
| 5,777,773 A | 7/1998 | Epworth et al. | |
| 5,805,235 A | 9/1998 | Bedard | |
| 5,856,980 A * | 1/1999 | Doyle | 714/704 |
| 5,920,416 A | 7/1999 | Beylat et al. | |
| 5,953,139 A | 9/1999 | Nemecek et al. | |
| 5,974,209 A | 10/1999 | Cho et al. | |
| 6,018,275 A * | 1/2000 | Perrett et al. | 332/127 |
| 6,081,361 A | 6/2000 | Adams et al. | |
| 6,096,496 A | 8/2000 | Frankel | |
| 6,104,851 A | 8/2000 | Mahgerefteh | |
| 6,115,403 A | 9/2000 | Brenner et al. | |
| 6,222,861 B1 | 4/2001 | Kuo et al. | |
| 6,271,959 B1 | 8/2001 | Kim et al. | |
| 6,298,186 B1 | 10/2001 | He | |
| 6,331,991 B1 | 12/2001 | Mahgerefteh | |
| 6,359,716 B1 | 3/2002 | Taylor | |
| 6,473,214 B1 | 10/2002 | Roberts et al. | |
| 6,506,342 B1 | 1/2003 | Frankel | |
| 6,563,623 B1 | 5/2003 | Penninckx et al. | |
| 6,577,013 B1 | 6/2003 | Glenn et al. | |
| 6,618,513 B2 | 9/2003 | Evankow, Jr. | |
| 6,654,564 B1 | 11/2003 | Colbourne et al. | |
| 6,665,351 B2 * | 12/2003 | Hedberg | 375/296 |
| 6,687,278 B1 | 2/2004 | Mason et al. | |
| 6,748,133 B2 | 6/2004 | Liu et al. | |
| 6,778,307 B2 | 8/2004 | Clark | |
| 6,810,047 B2 | 10/2004 | Oh et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,054,538 B2 | 5/2006 | Mahgerefteh et al. | |
| 7,076,170 B2 | 7/2006 | Choa | |
| 7,123,846 B2 | 10/2006 | Tateyama et al. | |
| 7,263,291 B2 | 8/2007 | Mahgerefteh et al. | |
| 7,280,721 B2 | 10/2007 | McCallion et al. | |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002120 A1 | 1/2003 | Choa | |
| 2003/0067952 A1 | 4/2003 | Tsukiji et al. | |
| 2003/0099018 A1 | 5/2003 | Singh et al. | |
| 2003/0147114 A1 | 8/2003 | Kang et al. | |
| 2003/0193974 A1 | 10/2003 | Frankel et al. | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0096221 A1 | 5/2004 | Mahgerefteh et al. | |
| 2004/0218890 A1 | 11/2004 | Mahgerefteh et al. | |
| 2005/0100345 A1 | 5/2005 | Welch et al. | |
| 2005/0111852 A1 | 5/2005 | Mahgerefteh et al. | |
| 2005/0175356 A1 | 8/2005 | McCallion et al. | |
| 2005/0206989 A1 | 9/2005 | Marsh | |
| 2005/0271394 A1 | 12/2005 | Whiteaway et al. | |
| 2005/0286829 A1 | 12/2005 | Mahgerefteh et al. | |
| 2006/0002718 A1 | 1/2006 | Matsui et al. | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0228120 A9 | 10/2006 | McCallion et al. | |
| 2006/0233556 A1 | 10/2006 | Mahgerefteh et al. | |
| 2006/0274993 A1 | 12/2006 | Mahgerefteh et al. | |

OTHER PUBLICATIONS

Prokais, "Digital Communications", 2001, 202-207, Fourth Edition, McGraw Hill, New York.

U.S. Appl. No. 11/068,032, Mail Date Feb. 11, 2008, Restriction Requirement.

U.S. Appl. No. 11/068,032, Mail Date Jun. 16, 2008, Office Action.

U.S. Appl. No. 11/068,032, Mail Date Dec. 16, 2008, Notice of Allowance.

U.S. Appl. No. 11/068,032, Mail Date Feb. 25, 2009, Notice of Allowance.

* cited by examiner

Figure 2. Power spectra of a non-return-to-zero digital signal using various formats: (red) pulse amplitude modulation. (brown) frequency shift keyed, and (green) correlated phase amplitude modulation (CPAM).

PHASE CORRELATED QUADRATURE AMPLITUDE MODULATION

REFERENCE TO PENDING PRIOR PATENT APPLICATIONS

This patent application:

(i) is a continuation-in-part of prior U.S. patent application Ser. No. 10/289,944, filed Nov. 6, 2002 now U.S. Pat. No. 6,963,685 by Daniel Mahgerefteh et al. for POWER SOURCE FOR A DISPERSION COMPENSATION FIBER OPTIC SYSTEM;

(ii) is a continuation-in-part of pending prior U.S. patent application Ser. No. 10/308,522, filed Dec. 3, 2002 by Daniel Mahgerefteh et al. for HIGH-SPEED TRANSMISSION SYSTEM COMPRISING A COUPLED MULTI-CAVITY OPTICAL DISCRIMINATOR;

(iii) is a continuation-in-part of prior U.S. patent application Ser. No. 10/680,607, filed Oct. 6, 2003 now U.S. Pat. No. 7,054,538 by Daniel Mahgerefteh et al. for FLAT DISPERSION FREQUENCY DISCRIMINATOR (FDFD);

(iv) claims benefit of pending prior U.S. Provisional Patent Application Ser. No. 60/581,076, filed Jun. 18, 2004 by Daniel Mahgerefteh et al. for PHASE CORRELATED AMPLITUDE MODULATION; and (v) claims benefit of pending prior U.S. Provisional Patent Application Ser. No. 60/615,834, filed Oct. 4, 2004 by Daniel Mahgerefteh et al. FOR PHASE CORRELATED QUADRATURE AMPLITUDE MODULATION.

The five above-identified patent applications are hereby incorporated herein by reference.

DESCRIPTION OF THE INVENTION

Presently a favored method of data transmission for internet traffic from central office to the home is asymmetric digital subscriber line technique over twisted wires. The twisted wires used for telephone lines have a limited bandwidth and were designed for voice traffic, which requires <4 kHz bandwidth. Download of internet data requires higher bandwidth on the order of MHz. However, as new applications are found for internet, higher bandwidth traffic will be needed to avoid increased download time.

At present the rate of data transmission is limited by two factors: 1. Attenuation of high frequencies caused by large capacitance and resistance in the line. 2. Increased error rate caused by distortion resulting from the group delay dispersion of the line. In order to increase the amount of information that is transmitted it is important to choose a modulation format that produces a narrower bandwidth.

The spectrum of a digitally modulated signal is determined by the product of the spectrum of the modulated pulse and the spectrum of the random digital data. The resulting spectrum can therefore be narrowed by choosing the modulation format, which determines the spectrum of the information carrying signal, and by the coding scheme used to represent the random data. A number of modulation formats, such as frequency shift keying (FSK) and quadrature amplitude modulation (QAM), and pulsed amplitude modulation (PAM) each use a different scheme to carry the data with varying degrees of spectral efficiency as described in J. G. Prokais, "*Digital Communication,*" hereby incorporated by reference. Adding correlation to the random bit sequence, or coding in general, can also reduce the spectral bandwidth. Duobinary coding is one example of this approach.

Figure 3:
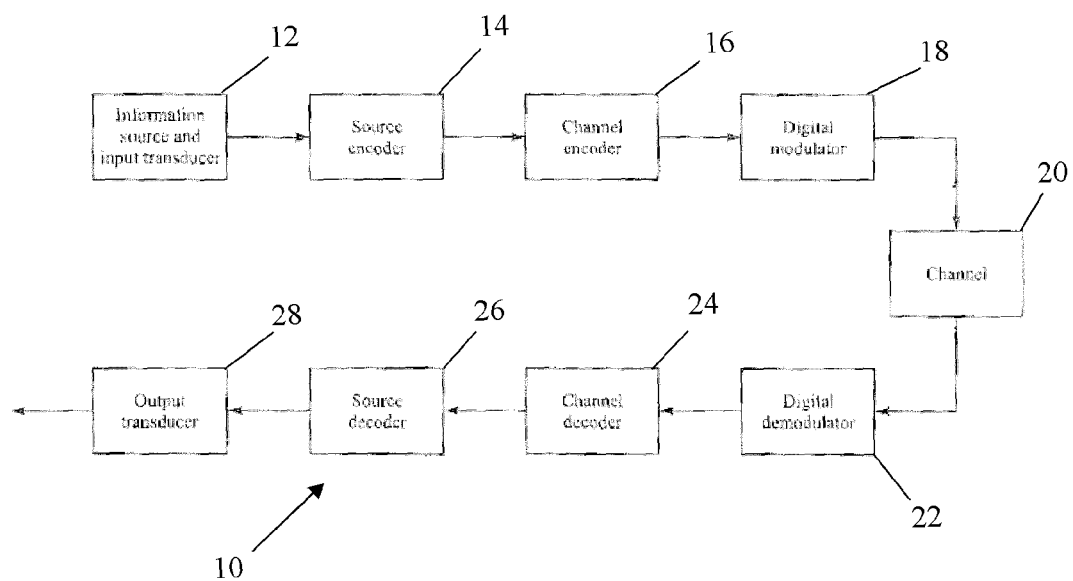
FIG. 3 illustrates a system including a transmitter for sending an optical signal to a receiver over a channel.

Referring to FIG. 3, an example of a digital transmitter, such as a wireless transmitter, having an information source an input transducer 12, a source encoder 14, a channel encoder 16, digital modulator 18, channel 20, digital demodulator 22, channel decoder 24, source decoder 26, and output transducer 28. J. G. Prokais, "Digital Communication," page 2, FIG. 1.1-1. The communication channel 20 is the physical medium that is used to send the signal from the transmitter to the receiver. In wireless transmission, the channel 20 may be the atmosphere (free space). J. G. Prokais, "Digital Communication," page 2.

In the present invention we disclose a method to decrease the spectral width of the digitally modulated signal by introducing correlation in the digital bits without coding. This method applies to all forms of digital communication regardless of the medium or the signal character. So it applies equally well to classical electrical communication though twisted pair wire, cable, as well as wireless communication, and optical communication. The only requirement is that there is a carrier wave, which is modulated.

PRIOR ART

A digitally modulated signal on a carrier wave can be represented mathematically as $$E(t) = A(t)\exp(-i\omega_c t + i\phi(t)), \qquad (1)$$

where $\omega_c$ is the carrier frequency, A(t) is the amplitude envelop, and $\phi(t)$ is the time varying phase. For a conventional pulse amplitude modulation (PAM), the amplitude carries the digital modulation in form of pulses representing 1 and 0 bits, while for conventional phase shift keying (PSK) format the phase is modulated by the digital signal. The digital signal is in form of pulses, g(t), separated by the bit period, T and can be written as $$d(t) = \sum_{n=-\infty}^{+\infty} a_n g(t - nT) \qquad (2)$$

where $a_n$ are the digital bits.

In order to increase the symbol rate multidimensional formats are used in which both the amplitude and phase carry information. This can increase bandwidth efficiency somewhat but at the cost of a higher required signal to noise ratio at the receiver. A favorite scheme for reducing bandwidth is called duobinary modulation. In this case the digital bits are encoded by a delay add circuit according to b.sub.n=a.sub.n+ a.sub.n+1. By adding this correlation to the initially random, uncorrelated bit sequence a.sub.n, the spectrum of the bit sequence b.sub.n, is reduced in width by a factor of 2. However, the resulting digital signal has 3 levels, and requires a decoder at the receiver to interpret the bits. In optical duobinary the encoding is performed at the transmitter by using a Mach-Zhender modulator. The encoder and decoder are added complexity and are not desirable

DESCRIPTION OF THE INVENTION

It is an objective of the present invention to reduce the bandwidth of a digital signal by encoding the same digital information in the amplitude and frequency of the carrier wave. This redundant modulation introduces correlation into the digital signal and reduces the spectral width without the need for a coder/decoder pair. More generally for a multidimensional digital signal, where amplitude, phase and frequency of the carrier may carry digital information, the same information is encoded in more than one dimension, such as in amplitude and phase, multi-level amplitude and multi-level frequency for the same effect, reducing bandwidth of resulting signal.

In the preferred embodiment of the present invention the signal is amplitude and frequency modulated simultaneously with the same base band digital data, we call this phase correlated amplitude modulation (PCAM):

$$E(t) = A(t) \exp[-i\omega_c t - i2\pi f_d \int_{-\infty}^{t} A(t')/A_0 dt'], \quad (3)$$

where $f_d$ is the peak to peak frequency deviation, and $A_0$ is the absolute value of the peak amplitude of the envelope signal. Here it is assumed that the envelope $A(t)$ has a zero average. In some embodiments, the amplitude excursion of the modulated carrier wave is higher than 10 decibels. Otherwise the average is subtracted in the integral of Eq. 3. The carrier frequency is therefore modulated and is given by:

$$f(t) = -\frac{1}{2\pi} \frac{d\phi(t)}{dt} = f_d A(t)/A_0. \quad (4)$$

Figure 1:
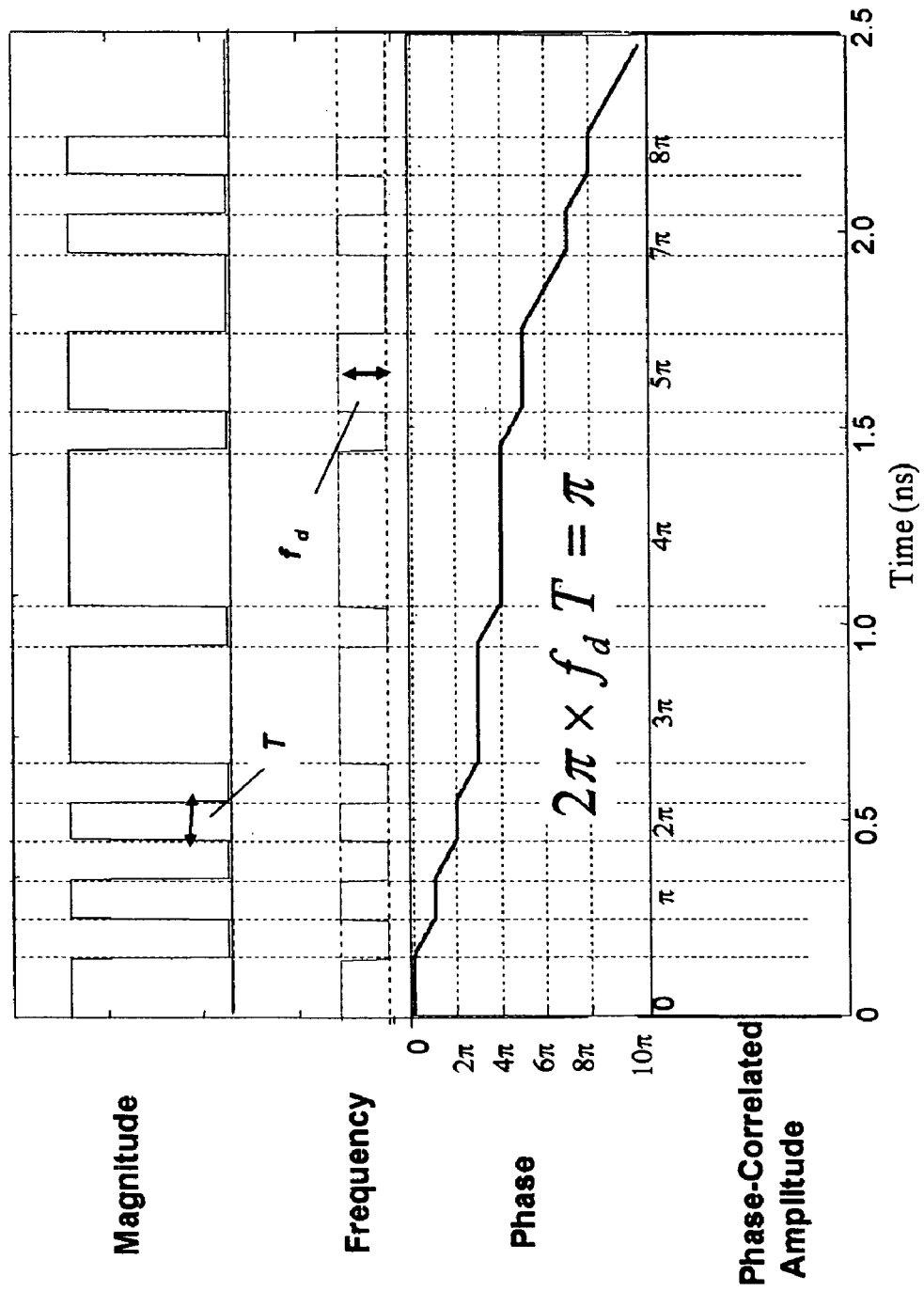
FIG. 1 is a plot of attributes of a signal generated in accordance with an embodiment of the present invention.

FIG. 1 shows an example of a PCAM signal for a portion of a binary digital signal. Note that the amplitude and frequency code for the same bit sequence, creating a correlation between adjacent bits through the phase of the signal. In this example the frequency excursion is chosen to induce a π phase shift for period T of the bit period: $f_d T = \frac{1}{2}$. In this case 1 bits have the same phase if they have even number of zeros or no zeros between them and are π out of phase if they have an odd number of 0 bits between them. It is an embodiment of the present invention that this phase correlation reduces the spectral width of the digital signal.

The power spectrum of a digital signal carrying signal in Eq. 2 is given in Proakis, "*Digital Communications,*" to be $$S(f) = \frac{1}{T} |G(f)|^2 \Phi_{ii}(f), \quad (5)$$

where $G(f)$ is the Fourier transform of the pulse shape $g(t)$, and $\Phi_{ii}(f)$ is the power density spectrum of the information sequence $\{a_n\}$, which is defined in terms of the autocorrelation function of the bit sequence as $$\Phi_{ii}(f) = \sum_{m=-\infty}^{\infty} \phi_{ii}(m) \exp(-i2\pi f mT), \quad (6)$$

where $$\phi_{ii}(m) = \frac{1}{2} \langle a_n a_{n+m}^* \rangle \quad (7)$$

is the expectation value of the autocorrelation of the bit sequence. Consider the example in which the frequency excursion produces a π phase shift over a bit period:

$$f_d T = \frac{1}{2} \quad (8)$$

In this case the digital signal in Eq. (1) can be written in terms of a set of coefficients, $b_n = 1, 0, -1$ which are not statistically independent. However, the probability of occurrence of a bit sequence in $b_n$ can be derived from the probability of occurrence of the parent sequence $a_n$ from which it was mapped. For example a 1 0 sequence in the original uncorrelated pattern $a_n$, which has a probability ¼, maps to either a 1 0 or a –1 0 with equal probability. Hence the probability of getting a 1 0 or a –1 0 in the new correlated sequence $b_n$ in the case is Using FIG. 1 as a reminder of the rule imposed by the frequency modulation, the neighboring $b_n$ sequences re related such:

If $b_n=1$, then $b_{n\pm1}=\{0,1\}$ with probability $\{¼,¼\}$ for each case,

If $b_n=0$, then $b_{n\pm1}=\{-1,0,1\}$ with probabilities $\{¼,½,¼\}$

If $b_n=-1$, then $b_{n\pm1}=\{0,-1\}$ with probabilities $\{¼,¼\}$ (9)

For neighboring bits farther than one bit away, $b_{n\pm m}$, m>=2, it can be shown that the correlation sums to zero. So the correlation bit length for this example is 1 and the bits are uncorrelated farther than 1 bit away. Using the definition of expectation value, in Eq. (7), and the relations in Eq. (9) the autocorrelation of the sequence $b_n$ is given by $$\phi_{ii}(m) = \lim_{N \to \infty} \frac{1}{2N} \sum_{n=-N}^{+N} b_n b_{m+n}^* = \begin{cases} \frac{1}{2} & m = 0 \\ \frac{1}{4} & m = \pm 1 \\ 0 & |m| \geq 2 \end{cases} \quad (10)$$

Substituting Eq. (10) for the autocorrelation of the bit sequence into Eq. (6), the power density spectrum of the bit sequence, $\{b_n\}$ is given by the first two terms to be $$\Phi_{ii}(f) = 4 \cos^2(\pi f T), \quad (11)$$

which has zeros at $f=\pm½T$, half the bit rate of the digital data. Hence the Phase correlated amplitude modulated digital signal has a spectral width that is ½ that of a standard amplitude modulated signal. Hence the PCAM produces a narrow spectrum similar to duobinary coded digital signal but without the coding.

Figure 2:
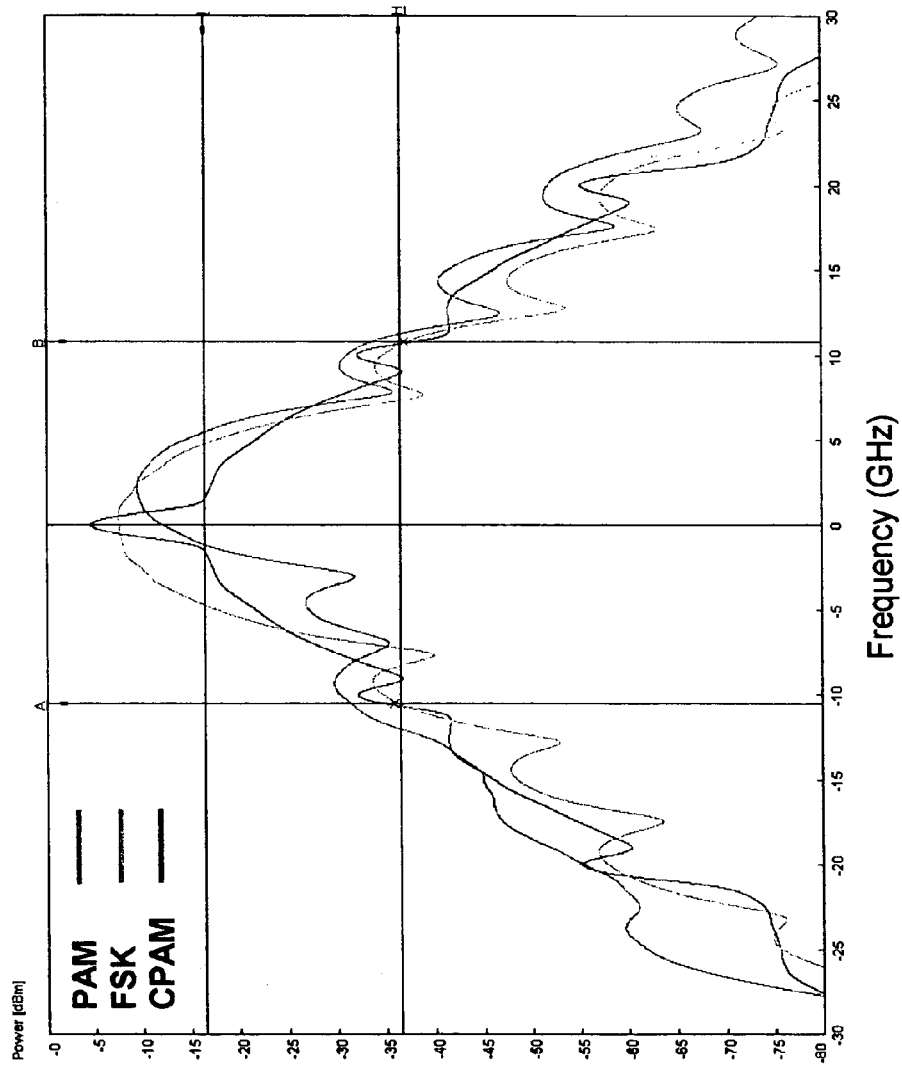
FIG. 2 is a spectral plot of a signal generated in accordance with an embodiment of the present invention and a signal generated according to the prior art.

FIG. 2 shows the spectra of a digital signal represented by pulse amplitude modulation (PAM), frequency modulation (FSK), and phase correlated amplitude modulation (PCAM). It is clear that the PCAM spectrum is narrower than both FSK and PAM. Note that in addition to producing a narrower spectrum the CPAM format also removes the carrier. In this example, where $f_d T=½$, half of the 1 bits have zero phase while the other half have π phase. Hence the integral of the signal over time, which determines the dc component of the power spectrum, averages to zero; there is no carrier.

The reduction in spectral width is related to what we call a phase correlation length, and is a function of the frequency excursion $f_d$. For the example $f_d T=½$, the correlation length is 1 bit long. (According to Eq. 10 the correlation is 0 for m>1). For $f_d T=1$, all pulses are in phase and there is no phase correlation. Hence the spectrum is not narrowed compared to the AM case. For $f_d T<½$ there is some spectral narrowing compared to AM case, however, and the carrier is reduced as shown in FIG. 3. In this Figure the carrier for the AM case has been artificially removed to make comparison easier.

The present invention can be generalized to multidimensional modulation, in which case one or more dimensions, such as amplitude, phase, or frequency carry the same data to create correlation in the modulation.

In another embodiment of the present invention, the phase correlated amplitude concept is applied to quadrature amplitude modulation (QAM). In prior art a QAM signal is mathematically represented by $$E(t)=f(t)\cos(2\pi f_c t)+g(t)\sin(2\pi f_c t) \quad (12)$$

where f(t) and g(t) represent two distinct digital signals each carrying independent random digital bit sequence, as given in Eq. 2. According to the present invention a phase correlated QAM signal is obtained by modulating the carrier frequency of the sin and cos components by the digital data according to:

$$Q(t)=f(t)\cos[2\pi f_c t+2\pi f_d\int_{-\infty}^{t}f(t')/f_0 dt']+g(t)\sin[2\pi f_c t+2\pi f_d\int_{-\infty}^{t}g(t')/g_0 dt'] \quad (13)$$

In this way the carrier frequency for the two quadrature signals is modulated and is given by $$f_{sc}(t)=f_c+f(t')/f_0$$

$$f_{cc}(t)=f_c+g(t')/g_0 \quad (14)$$

where $f_{sc}$ is the carrier frequency for the sine component and $f_{cc}$ is the carrier frequency for the cosine component. The frequency excursion $f_d$ is chosen to be related to the bit period. As an example, when $f_d T=½$, there will be a $\pi$ phase shift between 1 bits having an odd number of zeros in between them. The correlation between the bits created by the synchronous FM/AM modulation reduces the bandwidth in a similar manner to that shown above.

In another embodiment the simultaneous frequency and amplitude modulation is applied to a multilevel QAM signal. In this case, two independent bit sequences having values 0,1 in one case, and 0,2 in the other are added to generate a three level signal. The frequency modulation of the first signal, having 1 as the high level is modulated according to the amplitude signal where $f_d T=½$. For the second signal, where the high level is represented by amplitude 2, the synchronous frequency excursion, which also follows the amplitude is set to $f_d T=3/2$. In general this signal can have a cosine carrier and a second such signal with independent data can have a sine carrier. The addition of these two quadrature signals produces a 4 level QAM. This prescription for signal generation can be generalized to multilevel QAM by associating a different excursion frequency to each distinct high level such that $f_d T=(2k-1)/2$, and k=1, 2, 3, ....

What is claimed is:

1. A method of transmitting base band binary data contained in respective successive time cells using a digital communication system, the base band binary data being transmitted in the form of a signal obtained by amplitude modulation and frequency modulation of a wireless carrier wave
with a 0 bit data having a 0 bit mean amplitude and a 0 bit mean frequency and a 0 bit duration and a 1 bit data having a 1 bit mean amplitude and a 1 bit mean frequency and a 1 bit duration
the improvement wherein the amplitude and frequency are modulated with the same binary base band signal whereby to decrease a spectral width of the resulting modulated signal below the spectral width of the binary base band signal;
wherein a product of the 0 bit duration and a frequency excursion between the 1 bit mean frequency and the 0 bit mean frequency is equal to ½ such that the frequency excursion produces a $\pi$ phase shift between 1 bits having an odd number of 0 bits therebetween.

2. A method for transmitting a base band digital data signal having a bit period and a first bandwidth using a digital communication system, comprising:
providing a carrier wave having a carrier amplitude and a carrier frequency with 0 bit data having a 0 bit mean amplitude and a 0 bit mean frequency and a 0 bit duration and 1 bit data having a 1 bit mean amplitude and a 1 bit mean frequency and a 1 bit duration; and
synchronously modulating both the carrier amplitude and carrier frequency with the base band digital data signal, so as to reduce a bandwidth of the modulated carrier wave below the first bandwidth of the base band digital data signal;
wherein a product of the 0 bit duration and a frequency excursion between the 1 bit mean frequency and the 0 bit mean frequency is equal to about ½ such that the frequency excursion produces a $\pi$ phase shift between 1 bits having an odd number of 0 bits therebetween.

3. A method as in claim 2, wherein an amplitude excursion of the modulated carrier wave is higher than 10 decibels.

4. A method for transmitting a base band digital data signal having a bit period and a first bandwidth using a digital communication system, comprising:
providing a wireless carrier wave having a carrier phase and a carrier frequency with 0 bit data having a 0 bit mean amplitude and a 0 bit mean frequency and a 0 bit duration and 1 bit data having a 1 bit mean amplitude and a 1 bit mean frequency and a 1 bit duration; and
synchronously modulating both the carrier phase and carrier frequency with the base band digital data signal, so as to reduce a bandwidth of the modulated carrier wave below the first bandwidth of the base band digital data signal;
wherein a product of the 0 bit duration and a frequency excursion between the 1 bit mean frequency and the 0 bit mean frequency is equal to about ½ such that the frequency excursion produces a $\pi$ phase shift between 1 bits having an odd number of 0 bits therebetween.

* * * * *